INVENTOR.
JEAN JOSEPH RIVES

United States Patent Office 3,425,853
Patented Feb. 4, 1969

3,425,853
METHOD OF MANUFACTURE OF
SUPER-WHITE CEMENT
Jean Joseph Rives, Le Chesnay, France, assignor to
Ciments Lafarge, Paris, France, a corporation of
France
Continuation-in-part of application Ser. No. 115,727,
June 8, 1961. This application Nov. 2, 1964, Ser.
No. 408,244
Claims priority, application France, Apr. 7, 1961,
858,105
U.S. Cl. 106—101                 9 Claims
Int. Cl. C04b 7/36

ABSTRACT OF THE DISCLOSURE

An improved method for the production of super-white cements is disclosed. To achieve this result, the invention provides for the cooling of the hot freshly calcined cement clinker from a temperature of 1000°–1400° C. to below about 600° C. in a period of 5 to 25 minutes in a reducing atmosphere substantially free of contaminating impurities.

---

Figure 1:
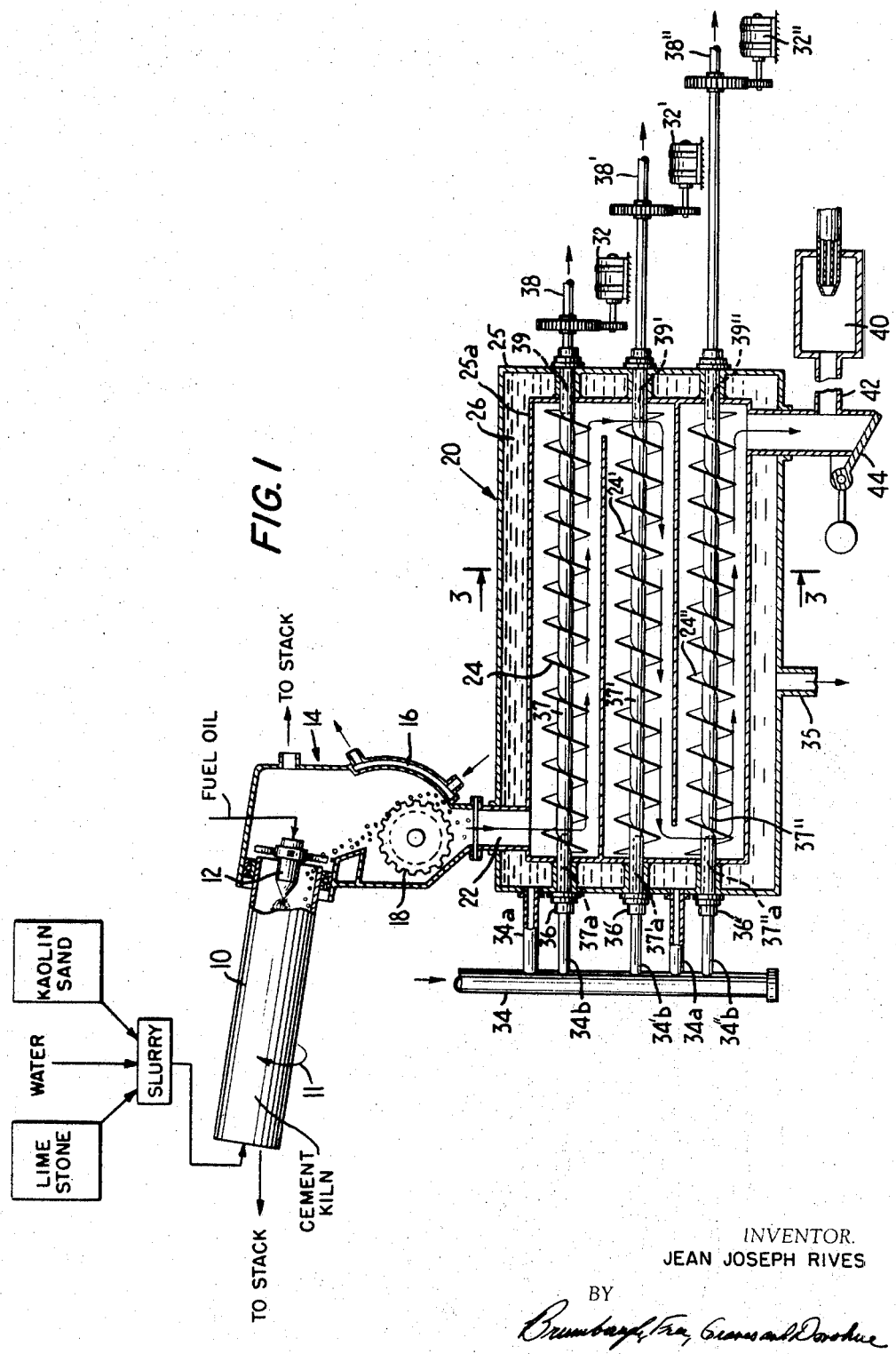

The present invention relates to a method for manufacturing super-white cement.

This is a division and a continuation-in-part of my copending application Ser. No. 115,727, filed June 8, 1961, and now abandoned.

Super-white cements may be distinguished from conventional cements by their color, but otherwise are substantially identical in chemical and physical characteristics. Super-white cements are prepared by following in general, the conventional process for the manufacture of portland cements. In order to insure high purity and whiteness in the product, however, certain precautions must be taken during the manufacturing steps. One such precaution is the use of raw materials which are relatively free of impurities. Iron, manganese and titanium oxides are considered particularly deleterious to high color purity or whiteness and should not comprise more than about 0.5% by weight of the clinker. Precaution must also be taken, particularly during the cooling of the cement clinker after it has been calcined, to avoid contact with gaseous impurities. The present invention is directed primarily toward an improvement in the cooling step.

The basic process for the manufacture of portland cement is by now well known. A good brief description of this process is given in "The Encyclopedia of Chemical Technology," vol. 3, edited by Kirk and Othmer and published by Inter-Science Encyclopedia Inc. (see pages 411 et seq.). Portland cement is prepared by heating a mixture of limestone (or calcareous material) and clay (or argillaceous material) to fusion. The resulting clinker is finely pulverized.

In the manufacture of super-white cement, according to the present invention, the calcined clinker is crushed immediately after the firing step, at which time the clinker is still at a temperature in the range of 1,000° to 1,400° C. The crushed clinker is then cooled in the presence of a pure reducing gas, to a temperature below about 600° C. Thereafter, the cooled, crushed clinker may be safely exposed to atmospheric conditions, and may be quenched if desired.

The principal calcerous materials used in the manufacture of cement are limestone, cement rock (a soft argillaceous limestone), chalk, marl, marine shells, and waste calcium carbonate from industrial processes. Argillaceous materials commonly employed are clays and shales. As indicated above, in the manufacture of super-white cement the raw materials are selected to be substantially free of impurities such as iron, manganese and titanium oxides.

A typical limestone suitable for the present invention may include the following materials:

|  | Percent |
|---|---|
| $SiO_2$ | 14.6 |
| $Al_2O_3$ | 0.6 |
| $Fe_2O_3$ | 0.19 |
| $CaO$ | 46.6 |
| $MgO$ | 1.0 |
| $CO_2$ (as carbonates) | 37.0 |

The foregoing is slurried with water and an argillaceous material of which kaolin sand is a good example. A suitable koalin sand has the following approximate composition:

|  | Percent |
|---|---|
| $SiO_2$ | 80.0 |
| $Al_2O_3$ | 12.0 |
| $Fe_2O_3$ | 0.5 |
| $CaO$ | 1.5 |

The calcareous and argillaceous materials are preferably used in such proportions that after firing the clinker will have a composition within the following approximate limits (in weight percent):

|  | Percent |
|---|---|
| $SiO_2$ | 24–27 |
| $Al_2O_3$ | <2.5 |
| $Fe_2O_3$ | <0.4 |
| $CaO$ | 69.5–72.5 |
| $MgO$ | 0–3 |

It is preferred, in firing the slurry of calcareous and argillaceous materials, to take precautions to avoid contamination with ash from the combustion products. For this reason, fuel oils are preferably employed because the combustion of fuel oils normally leaves relatively little ash residue. Obviously, gaseous fuels might also be employed for this same reason, particularly if such fuels were available under economically attractive conditions.

The formation of the clinker in the calcining process occurs at a temperature of 1400°–1500° C. The exact temperature of clinker formation is, as is well known, a function of the composition of the raw material. After the clinker passes the hottest portion of the furnace wherein it is converted to a semi-molten mass, it progresses further and becomes somewhat cooler toward the outlet end of the furnace. Cooling is sufficient for the clinker to resume a solid state.

In the process of the present invention it is important that the cement clinker be highly porous after calcining. It is for this reason that it is necessary to specify an $Al_2O_3$ content in the clinker of less than about 1.3%. The clinker should have a porosity of at least 35%, and preferably, a porosity of 40% or more.

Immediately upon leaving the outlet of the furnace, the clinker, still at a temperature of about 1400° C. is crushed in a water-cooled crusher. During the crushing, the clinker cools somewhat so that as it enters the cooling stage, its temperature is normally between about 1000° and 1400° C. In the preferred embodiments of this invention, it has been found that best results are obtained if the clinker entering the cooler is between about 1150° and 1200° C.

In the production of super-white cement, the conditions under which the cement is cooled from the temperature at which it leaves the crusher to below about 600° C. are particularly important.

It has been discovered that cements of unexpected whiteness can be obtained by cooling the clinker over this temperature range in a period of time between about 5 and about 25 minutes. Preferably, the cooling is completed in 5–10 minutes.

It has, furthermore, been found that during cooling each parcel of crushed clinker must be well mixed. In one embodiment, the desired mixing may be carried out in a substantially vertically cooling vessel. A batch of hot, crushed clinker is received in the cooler. It is cooled by passing the cooling gas upwardly at a velocity sufficient to fluidize the mass or by mechanically agitating the crushed clinker. A cooling jacket is preferably provided around the cooler.

For most commercial purposes, however, such equipment is relatively cumbersome. It has been found much more advantageous and expeditious to use a horizontal tubular cooler, of the type commonly used for cooling cement clinkers, and to equip such a cooler with at least one internal mixing screw which advances the cooling clinker along the length of the cooler. The screw conveyor in the horizontal cooler will divide the crushed cement clinker into a plurality of parcels each of which is moved through the cooler at a rate depending upon the speed at which the screw is rotated. The screw, furthermore, thoroughly mixes each parcel of clinker as it advances through the cooler. Agitation may be further increased by providing fins on the blades of the screw and it is usually preferred to do so.

Another important aspect of the cooling operation which has been discovered is that the cooling gas should be pure. Typically a suitable pure gas will have a molar composition within the following limits:

| | Percent |
|---|---|
| Sulfur | <0.5 |
| $CO/CO_2$ | 0.5–2 |
| Hydrogen | 1.0–5 |
| Condensible hydrocarbons and partial combustion products | <0.5 |

In the preferred embodiments, the reducing gas has a $CO/CO_2$ ratio of about 1, a sulfur content of no more than 0.3% and a concentration of condensible partial combustion products and unburned hydrocarbons of no more than 0.3%.

Suitable reducing gases having the foregoing composition are preferably obtained by the combustion of hydrocarbon gases. The $C_1$ to $C_4$ gases are suitable; however propane is particularly convenient in many cases. Combustion is carried out with an excess of fuel over that required with stoichiometric combustion, e.g. a fuel-air ratio of more than 1. In order to obtain the ratio of $CO/CO_2$ and hydrogen content specified above, a fuel-air ratio in the order of 1.1 or greater will usually be required (that is at least 1.1 times the amount of fuel which is stoichiometrically equivalent to the amount of air supplied to the combustion zone). The fuel-air ratio required will depend, of course, on the carbon-to-hydrogen ratio of the fuel. Furthermore, the combustion conditions must be carefully regulated so that the combustion gases are substantially free of unburned hydrocarbons and condensible partial combustion products (e.g. aldehydes, etc.).

The reducing gas of the foregoing description is contacted countercurrently with the crushed cement clinker in the cooler. Preferably, in order to maintain complete exclusion of air, the cooling apparatus is at a slightly super-atmospheric pressure (½ inch of water or more).

Figure 2:
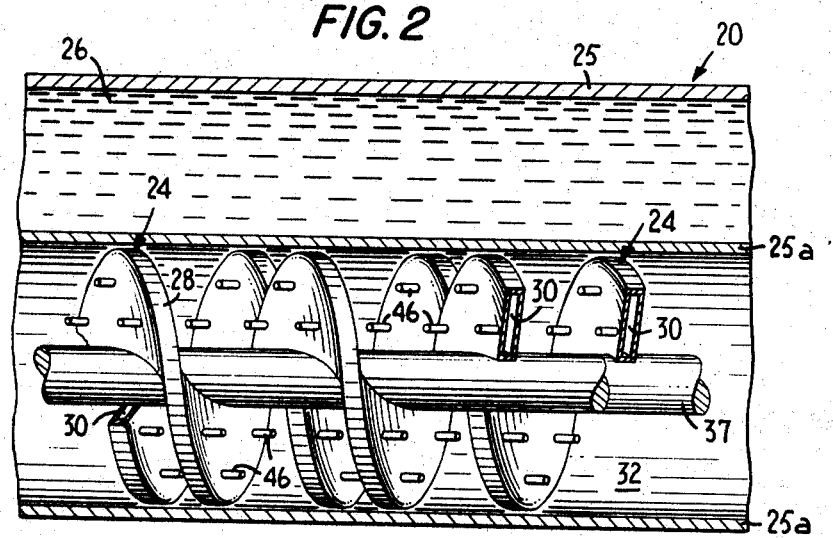
Figure 3:
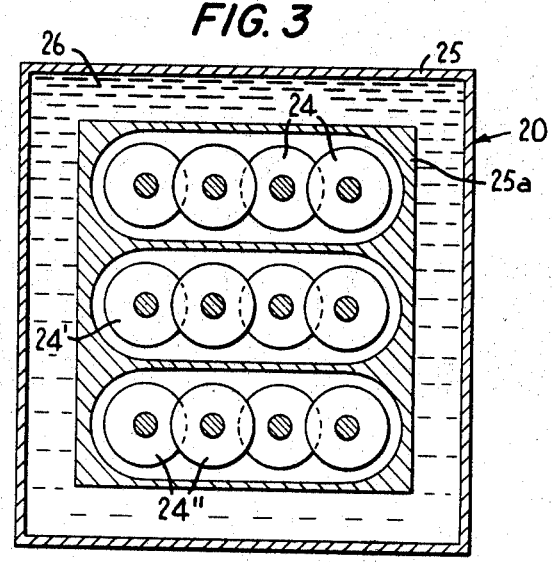

For a better understanding of the present invention, reference may be had to the figures in which:

FIG. 1 schematically illustrates a typical process for the manufacture of super-white cement according to the present invention; and FIGS. 2 and 3 illustrate the detail of a preferred cooling apparatus suitable for the present invention.

Referring to FIG. 1, limestone and kaolin are mixed with water to produce a slurry. This slurry is then fed into the upper end of the main cement kiln 10. In the conventional manner, the cement kiln is rotated slowly, as indicated by arrow 11, and by such rotation the slurry entering the upper end of the kiln tumbles toward the lower end thereof. During the travel from the upper end to the lower end of the kiln, the cement is clinkered at a temperature in the order of 1400°–1500° C. at an intermediate zone of the kiln, and becomes somewhat cooler at the lower end of the kiln.

The heat is provided by firing the kiln at its lower end by a fuel oil through burner 12. As indicated above, fuel oil is preferably used to avoid contamination of the cement with ash. Obviously, therefore, low ash fuel oil will be more advantageous than low quality residual fuels. Similarly, fuel gases, if available under economically attractive conditions, could likewise be employed.

The cement clinker leaving the lower end of kiln 10 at a temperature of about 1400° C. falls into a crusher 14. Crusher 14 is provided with a water jacket 16. The cement clinker is crushed to an appropriate fineness which permits it to be subsequently processed. Typically it is reduced in size to approximately 200 mesh.

The clinker after passing through crusher 14 falls into a cooler 20. At the throat 22 of cooler 20, the cement clinker is at a temperature between about 1000° C. and 1400° C. Preferably, the temperature is between about 1150° C. and about 1200° C.

A preferred cooler for the practice of this invention is shown schematically in FIG. 1. Details thereof are illustrated in FIGS. 2 and 3. Mixing screws 24, 24′ and 24″ are provided in cooler 20 comprising several parallel screws arranged inside of a double walled casing 25, 25a having a water jacket 26. The screws are arranged in three tiers of interleaved screws as shown most clearly in FIG. 3. As illustrated in FIG. 1, these tiers are arranged so that the cement clinker flows sequentially through the three tiers as it is cooled.

As shown in FIG. 2, the blade 28 of each of the screws contains a hollow water passage 30 through which cooling water is circulated. The cooling water circulated through the hollow passage 30 in addition to the water circulating through the cooling jacket 26 provides improved control over the cooling rate obtained in the cooling apparatus.

In the practice of this invention it is important that the cement clinker be cooled from the temperature at which it enters the cooler (e.g., about 1200° C.) to below about 600° C. in a period of between 5 and 25 minutes. The clinker should neither be quenched rapidly, nor cooled excessively slowly. Preferably, the cooling is completed in about 10 minutes or less. To achieve the desired residence time in the cooler, the rate of rotation of screws 24, 24′ and 24″ should be appropriately adjusted by controlling the drive means 32, 32′ and 32″.

Cooling water for the jacket 26 is provided from a header 34 via connecting pipes 34a. Coolant for the cooling passages in screws 24, 24′ and 24″ is provided from the same header via connectors 34b, 34′b and 34″b and appropriate stuffing box connections 36, 36′ and 36″ to passages 37a, 37′a and 37″a in the shafts 37, 37′ and 37″. Passages 37a, 37′a and 37″a in turn connect to the cooling passages in each screw. Spent cooling water is discharged from the jacket 26 via drain 35. Spent cooling water leaves the cooling passages in screws 24, 24′, 24″ via passages 39, 39′ and 39″ in shafts 37, 37′ and 37″ and is discharged to the drain via pipes 38, 38′ and 38″. Control of the amount of cooling water employed permits the regulation of the temperature of the cooled clinker leaving the cooler.

As mentioned above, an important aspect of this invention is that each parcel of cement clinker is vigorously mixed during the cooling step. In the preferred embodiment, this is accomplished by providing for an overlapping of the screws in each set of screw mixers 24, 24′ and 24″ (illustrated in FIG. 3), which advances the clinker being cooled at a regulated rate. The screw mixers are also provided with a plurality of fins 46 to keep each parcel of cement clinker agitated as it is advanced. As mentioned, the same result may be obtained in batch-wise cooling by holding a batch of clinker in an agitated vessel for the requisite period of time.

Another important aspect of the cooling step is that atmospheric oxygen must be carefully excluded. For this reason it is necessary to provide a pure reducing gas in the cooling chamber. This is conveniently obtained by burning a gas such as propane in burner 40. The resulting reducing gas enters the cooler 20 via pipe 42 and then flows countercurrently to the cooling cement clinker through the cooler up the throat 22 of the crusher, and thence to a stack (not shown). Appropriate apparatus (also not shown) to recover any dust may be provided if desired.

In order to exclude atmospheric oxygen, it is also necessary to provide a suitable lock for the removal of the cement clinker. As illustrated in FIG. 1, this may be a counter-balanced valve 44 which is opened periodically by the weight of accumulated clinker. Other devices will be apparent to those skilled in the art. The particular means employed forms no part of the present invention.

As indicated above, in a reducing gas of typical purity the $CO/CO_2$ ratio should be between about 0.5 and 2 and the gas should contain between about 1% and about 5% hydrogen. In addition, it is important that impurities such as soot, condensible hydrocarbons and partial combustion products, and sulfur be maintained at low concentrations. The conditions can be conveniently met by generating reducing gas from the combustion of relatively pure petroleum gases such as methane, propane, etc.

For a further understanding of this invention, Example 1 illustrates the preparation of a typical super-white cement.

Example 1

A cement rock was crushed to a particle size of less than about 15 millimeters diameter. The rock employed had the following composition:

| | Percent |
|---|---|
| $SiO_2$ | 14.6 |
| $Al_2O_3$ | 0.6 |
| $Fe_2O_3$ | 0.19 |
| CaO | 46.6 |
| MgO | 1.0 |

To two parts by volume of the foregoing, one part by volume of a kaolin sand of the following composition was added:

| | Percent |
|---|---|
| $SiO_2$ | 80.0 |
| $Al_2O_3$ | 12.0 |
| $Fe_2O_3$ | 0.4 |
| CaO | 1.5 |

The coarse mixture was thereupon ground in the presence of water until a homogeneous slurry was obtained. The proportions of cement rock and kaolin sand were so selected that the cement after calcining would have the following composition:

| | Percent |
|---|---|
| $SiO_2$ | 25.4 |
| $Al_2O_3$ | 1.2 |
| $Fe_2O_3$ | 0.3 |
| CaO | 71.4 |
| MgO | 1.2 |

This slurry was passed through the cement kiln as described above, and fired at a maximum temperature between about 1400° and 1500° C. A sea-green, highly porous clinker resulted. The porosity of the clinker was 40%.

The clinker leaving the kiln was crushed in the crusher to a particle size fine enough to pass through the 2½″ mesh screen with a maximum refuse of 2%. The temperature of the crushed material leaving the clinker was about 1100° C. This crushed material thereupon dropped into a cooler of the type illustrated in FIG. 1. The material was forced through the cooler, by rotation of the water-cooled screws, in a period of about ten minutes after which period of time the temperature of the crushed clinker was reduced to about 600° C. A pure reducing gas obtained by the combustion of propane in an inadequate supply of air was passed countercurrently to the cooling clinker. The molar composition of the cooling gas was as follows:

| | Percent |
|---|---|
| $H_2$ | 2 |
| $CO/CO_2$ | 1.1 |
| S | 0.3 |
| Condensibles | 0.3 |

The whiteness of the resulting super-white cement obtained was between 92 and 95%. By contrast, the previously known processes for manufacturing super-white cements yielded products having a whiteness of less than about 90%.

Example 2

A crude homogeneous slurry was prepared as in Example 1 by mixing in the presence of water a cement rock having the following composition:

| | Percent |
|---|---|
| $SiO_2$ | 15.6 |
| $Al_2O_3$ | 0.90 |
| $Fe_2O_3$ | 0.20 |
| CaO | 45.9 |
| MgO | 0.6 |
| $CO_2$ | 36.8 | and a kaolin sand of the following composition:

| | Percent |
|---|---|
| $SiO_2$ | 67.4 |
| $Al_2O_3$ | 20.3 |
| $Fe_2O_3$ | 0.5 |
| CaO | 1.0 |
| MgO | 0.5 |

The cement rock contained 83.3% carbonates and the kaolin sand 80.5% carbonates. In order to obtain the desired final contents of carbonates in the cement of 81.3% 1.1 vol. of said cement rock was added to 1.7 vol. of said kaolin sand.

The crude slurry thus obtained had the following analysis:

| | Percent |
|---|---|
| $SiO_2$ | 16.7 |
| $Al_2O_3$ | 1.30 |
| $Fe_2O_3$ | 0.20 |
| CaO | 44.0 |
| MgO | 0.6 |

The firing, crushing and cooling were carried out in the same conditions as detailed in Example 1 and final cement clinker obtained after calcining corresponded to the following composition:

| | Percent |
|---|---|
| $SiO_2$ | 26.5 |
| $Al_2O_3$ | 2.1 |
| $Fe_2O_3$ | 0.32 |
| CaO | 69.9 |
| MgO | 1.0 |

The whiteness of the super-white cement obtained was between 93 and 95%.

As employed herein, the term "whiteness" refers to the reflectivity as measured in a Toussaint photocolorimeter. The apparatus measures the whiteness of the cement by comparing it with a standard white sample. The reflectivities $I_c$, successively of violet, blue, green, yellow, orange, and red lights were determined. The whiteness index is the average of six individual reflectivities:

$$I_w = \frac{\Sigma I_c}{6}$$

What I claim is:

1. A process for producing super-white cement comprising the steps of:
   (a) calcining a mixture of calcareous and argillaceous materials at a temperature between about 1400° C. and about 1500° C. to obtain a clinker, containing, in weight percent, between about 24% and about 27% silica, less than about 2.5% $Al_2O_3$, less than about 0.4% $Fe_2O_3$, and about 69.5% to about 72.5% calcium oxide, and not more than about 3% magnesium oxide, said clinker having a volume porosity of at least about 35%;
   (b) crushing said clinker to obtain a pulverized solid having an average particle size of not more than ½ inch, the crushed clinker having a temperature between about 1000° C. and 1400° C.; and
   (c) cooling said crushed clinker in the presence of a reducing gas, said cooling being carried out on successive parcels of clinker, each parcel being cooled under well-mixed conditions, to a temperature below about 600° C., said reducing gas having a $CO/CO_2$ molar ratio of about 0.5 to about 2.0, a hydrogen content of about 1 mole percent to about 5 mole percent, a sulfur content of less than about 0.5 mole percent and a content of condensible hydrocarbons and partial combustion products of less than 0.5 mole percent, said cooling step being completed in a period of about 5 to about 25 minutes.

2. A process according to claim 1 wherein said cement kiln is fired with fuel oil.

3. A process according to claim 1, wherein said clinker after calcining has a porosity of about 40%.

4. A process according to claim 1, wherein said reducing gas is obtained by combustion of a hydrocarbon gas.

5. A process according to claim 4, wherein said hydrocarbon is propane.

6. A process for producing super-white cement comprising the steps of:
   (a) calcining a mixture of calcareous and argillaceous materials to obtain a cement clinker, said calcareous and argillaceous materials being so chosen that the clinker contains less than about 0.5% by weight $Fe_2O_3$, and has a volume porosity of about 40%;
   (b) crushing said clinker to obtain a pulverized solid, the crushed clinker being at a temperature between about 1000° C. and about 1400° C.; and
   (c) cooling said crushed clinker in the presence of a reducing gas, said reducing gas containing less than about 0.3 mole percent of sulphur and having a content of condensible hydrocarbons and partial combustion products of less than about 0.3 mole percent, said cooling being carried out on successive parcels of clinker, each parcel being cooled under well mixed conditions, to a temperature below about 600° C., in a period of about 10 minutes.

7. A process according to claim 6 wherein said reducing gas is obtained by the combustion of propane.

8. A process according to claim 6 wherein said crushed clinker has a temperature of about 1100° C.

9. A process according to claim 6 wherein the cement clinker has the following approximate composition in weight percent:

| | Percent |
|---|---|
| $SiO_2$ | 25.4 |
| $Al_2O_3$ | 1.2 |
| $Fe_2O_3$ | 0.3 |
| CaO | 71.4 |
| MgO | 1.2 | wherein said crushed clinker has a temperature of about 1100° C., and wherein said pure reducing gas is obtained by the combustion of propane in an inadequate supply of air.

References Cited

UNITED STATES PATENTS

| 1,859,926 | 5/1932 | Larmoor et al. | 106—102 |
| 2,945,688 | 2/1959 | Pajenkamp et al. | 106—101 |
| 2,970,925 | 2/1961 | Dyckerhoff | 106—100 |
| 2,989,396 | 6/1961 | Lewis | 75—35 |
| 3,085,022 | 4/1963 | Koch | 106—101 |

FOREIGN PATENTS

| 814,836 | 6/1959 | Great Britain. |
| 857,105 | 12/1960 | Great Britain. |
| 857,218 | 12/1960 | Great Britain. |

OTHER REFERENCES

Lea and Desch, The Chemistry of Cement and Concrete, Edward Arnold Ltd., London; 1956, 2nd edition, pp. 461–462.

Metals Handbook, American Soc. for Metals, 1936 edition, pp. 92, 93.

Metals Handbook, American Soc. for Metals, 1948 edition, pp. 294–298.

TOBIAS E. LEVOW, *Primary Examiner.*

S. E. MOTT, *Assistant Examiner.*

U.S. Cl. X.R.

263—53